United States Patent [19]
Dietrich

[11] 4,040,491
[45] Aug. 9, 1977

[54] AUTOMATIC RESET PLOW

[75] Inventor: William J. Dietrich, Congerville, Ill.

[73] Assignee: DMI, Inc., Goodfield, Ill.

[21] Appl. No.: 605,160

[22] Filed: Aug. 15, 1975

[51] Int. Cl.² ............................................. A01B 61/04
[52] U.S. Cl. .................................. 172/269; 172/266; 172/699
[58] Field of Search ............ 37/42 VL; 172/269, 710, 172/705, 264, 265, 266, 267, 268

[56] References Cited

U.S. PATENT DOCUMENTS

| | | | |
|---|---|---|---|
| 1,331,424 | 2/1920 | Fanberg | 172/269 |
| 2,756,659 | 7/1956 | Lindeman | 172/269 |
| 2,935,144 | 5/1960 | Graham | 172/710 X |
| 3,402,775 | 9/1968 | Leduc | 172/705 |

FOREIGN PATENT DOCUMENTS 1,006,919  12/1956  Germany .............................. 172/705

*Primary Examiner*—George J. Marlo
*Attorney, Agent, or Firm*—Tilton, Fallon, Lungmus, Chestnut & Hill

[57] ABSTRACT

A linkage assembly supports a moldboard plow. A cam member having a seat engaging a roller is pivotally connected to the linkage assembly. A spring assembly is pivotally connected between the cam member and the linkage assembly to urge the plow in a normal plowing position. When the plow bottom encounters an object the cam seat disengages the roller and the plow rises quickly. After the obstruction is passed, the plow resets. During reset, the roller rides on a cam surface which controls the force of the spring urging the plow to reset. The locus of the plow tip when it initially strikes an object is more rearward than upward to give the unit better ability to respond at higher ground speeds. The tip of the plow is inclined downwardly during reset to facilitate rapid re-entry to proper plowing depth.

9 Claims, 4 Drawing Figures

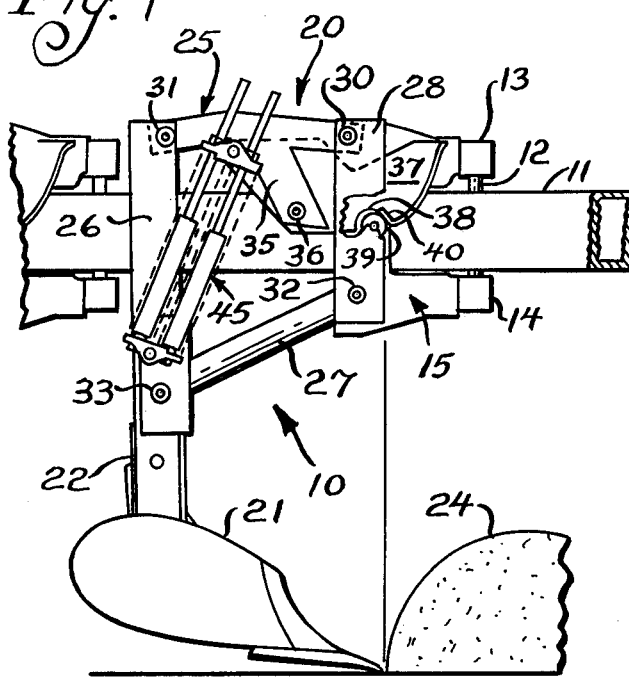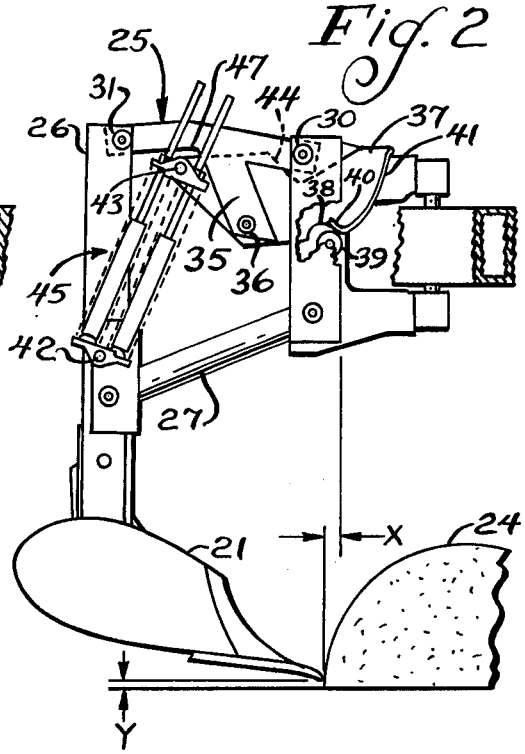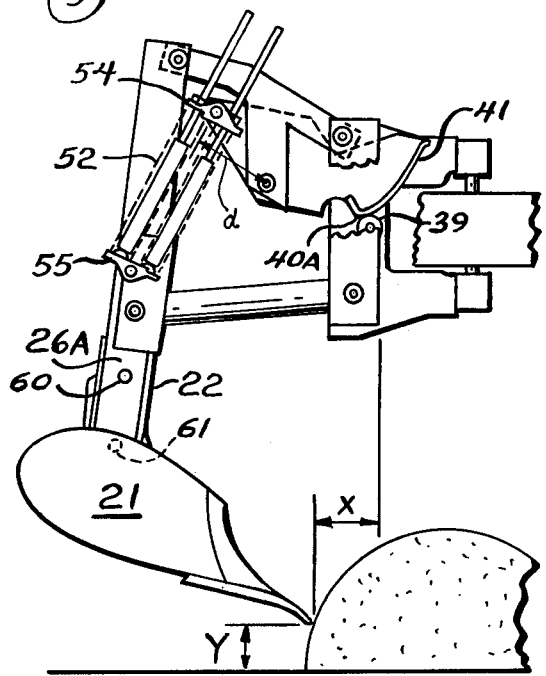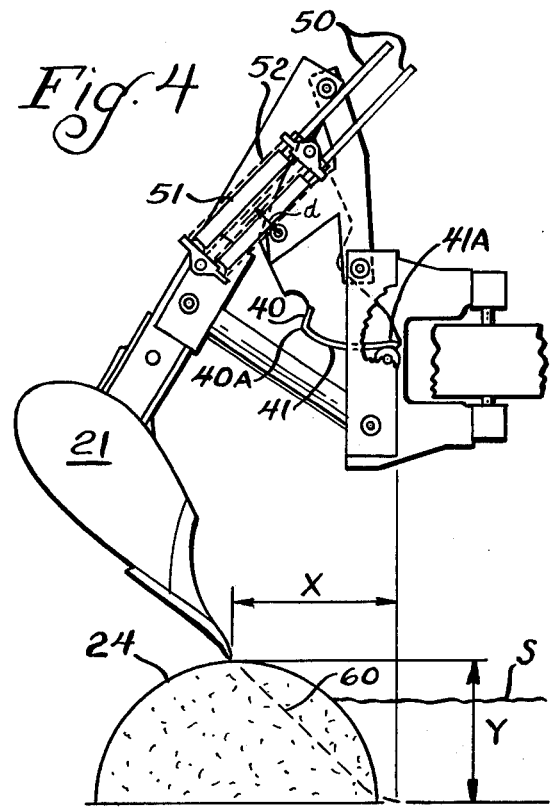

AUTOMATIC RESET PLOW

BACKGROUND AND SUMMARY

The present invention relates to an agricultural implement; and more particularly, it relates to an automatic reset plow. Automatic reset plows employ conventional moldboard plow bottoms, but they have the ability, upon striking an object in the ground, to be raised upward so as to clear the object, and then to re-enter the ground after passing the object.

Currently, farmers use larger plow units which may carry four to fourteen or more individual plows, and each of these units normally incorporates an automatic reset feature so that each unit may be raised and re-enter the ground independently of the others.

With the increased power of larger modern tractors, not only are the plow units able to dig at deeper depths, but the speed of plowing is a major factor to be considered in automatic reset plows. A typical speed for a plow bottom digging at a depth of 8–12 inches may be 10 lineal feet per second, which leaves very little time (about one-eighth of a second) to completely raise the plow bottom from the soil when an object is struck.

Another problem encountered in automatic reset plows is the different soil conditions, which may be caused by varying degrees of moisture in the soil as well as by soil conditions themselves. Some prior reset plows have the disadvantage that they will reset spontaneously under certain soil conditions even though an object is not struck. This problem may be further accentuated if the plow bottom is not held at a constant desired depth. For example, if the depth of plowing should increase substantially, obviously, the drag force on the plow bottom will increase substantially, and this may cause a spontaneous, undesired withdrawal of the plow.

Still another problem with certain prior construction is that after the plow bottom has been completely withdrawn, the unit does not re-enter the ground to the desired depth immediately. Considering the speed of the draft vehicle, a substantial portion of land could remain unplowed if the plow unit does not reset itself quickly.

Briefly, the present invention provides an automatic reset plow having a linkage assembly for mounting the plow bottom; and it includes a cam member and a spring unit. The spring unit urges the plow bottom into the ground, and the cam member is interconnected between the spring unit and the linkage assembly for controlling the compression of the spring unit, and thus the force urging the plow bottom into the ground. The cam member includes a seat which, in the normal plowing position, engages a roller.

The cam seat provides a threshold value of force which must be overcome by the thrust on the plow unit before the plow can be raised any appreciable amount. That is, the plow bottom will continue at plowing depth for varying conditions until it encounters sufficient obstruction to disengage the roller from the cam seat.

The cam seat includes a first portion of a cam surface which must ride over the roller before withdrawal of the plow can occur. This first portion of the cam surface is designed to cause a relatively high compression of the spring unit during initial movement of the plow tip.

Once the cam seat is disengaged from the roller, a second portion of the cam surface rides along the roller, and the shape of this second portion is such as to compress the spring unit at a lesser rate. One of the principal features of the invention is that the shape of the cam surface can be designed to account for variations in soil conditions for different localities.

The linkage assembly includes an upright rear link, an upper link and a lower link, the latter being pivotally connected between the rear link and a forward mounting position. The lower link extends rearwardly and downwardly in the normal, plowing position, whereas the upper link is approximately horizontal. When an object is encountered, the locus of the tip of the bottom is primarily rearward (allowing reaction time for the unit), and thence rearwardly and upwardly relative to its mounting, thereby enabling the plow bottom to clear the object quickly and efficiently. Further, during re-entry, the plow bottom is inclined with its tip in a downward position upon reset to facilitate rapid re-entry to the proper plowing depth. A plow shank is fixed to the rear link by an upper bolt connection and a lower bolt connection allowing for the bottom bolt to shear before serious damage would occur should an object be encountered which cannot be cleared.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a side view of an automatic reset plow incorporating the present invention with the plow bottom in a normal, plowing position;

FIG. 2 is a view similar to FIG. 1 showing the unit immediately after striking an object; and FIGS. 3 and 4 are views similar to FIG. 2 showing the reset action at progressively further stages.

DETAILED DESCRIPTION

Referring to FIG. 1, reference numeral 10 generally designates an automatic reset plow unit according to the present invention. The plow unit 10 is mounted to a horizontal beam 11 by means of an upright shaft 12. The shaft 12 is journaled in upper and lower blocks 13, 14 of a yoke designated 15. The yoke 15 is thus free to pivot about a vertical axis extending along the axis of the shaft 12.

In the illustrated embodiment, the plow unit 10 may be one of a number of similar units secured to the beam 11 in accordance with the teachings of the Kinzenbaw U.S. Pat. No. 3,817,333, issued June 18, 1974 for "Plow System with Plurality of Plow Units and Means for Adjusting Spacing between Units in a Continuous Manner."

The coulter may be provided in front of the plow unit 10 and attached to the yoke 15, if desired. Secured to the rear of the yoke 15 is a linkage assembly generally designated by reference numeral 20. A plow bottom 21 is mounted to the linkage assembly 20 by means of a shank 22. In FIG. 1, the plow bottom is seen in its normal plowing position, just prior to striking an object designated 24. The soil being plowed is not shown for clarity in FIGS. 1–3, but may be seen at S in FIG. 4.

The linkage assembly 20 includes an upper link 25, a generally upright rear link 26, and a lower line 27. The forward ends of the upper link 25 and lower link 27 are pivotally connected to a member 28 which is rigidly secured to the yoke 15. Thus, the linkage assembly includes four pivot connections: upper forward and rear connections designated 30 and 31 respectively, and lower forward and rear connections 32, 33.

The upper link 25 includes a depending portion 35 which is pivotally connected at 36 to a cam member 37. The central portion of the fixed link 28 is broken away to show a seat designated 38 on the cam 37. A roller 39 is mounted to the fixed link 28 (which may comprise two separate side plates spaced by the roller 39, although only one is shown in the drawing).

The cam member 37 may be formed of steel plate material and it is provided with a cam surface including a first portion designated 40 adjacent the seat 38 for engaging the roller 39 in the normal, plowing position, and it also includes a turning point or threshold 40A (FIG. 4) and a second portion 41 (see FIGS. 2 and 3), the function of which will be described presently. The cam surface 40, 41 may be reinforced to extend beyond the width of the cam 37.

The upper link 25 is also formed of two similarly shaped plate members which are arranged on either side of the cam 37 so as to straddle it. The plate members are connected together by tubes forming journals for the three pivot positions indicated at 30, 31 and 36.

Referring now to FIG. 2, the rear end of the cam member 37 is pivotally connected at 43 to the upper end of a spring unit generally designated 45, the lower end of which is pivotally connected at 42 (see FIG. 2) to the rear link 26.

Still referring to FIG. 2, the cam member 37 is cut away at 44 to allow clearance for the pivotal connection at 30 for all positions of the unit, and the upper link 25 is bent at 47 to allow clearance for the upper pivotal connection 43 of the spring unit 45.

The spring unit 45 includes four compressed coil springs (two on either side of the cam member 37). Only one pair of the spring is seen in the drawing, but the other pair is similar. The springs are mounted coaxially with threaded rods 50 provided with inner guide sleeve 51. Each pair of springs, shown diagrammatically by the dashed lines 52, is held between upper and lower end castings 54, 55 (FIG. 3). The upper end castings are connected to a pivot shaft 43, and the lower end castings are connected to a pivot shaft 42 by means of bolts threaded into the castings and engaging one of the shafts. The upper end casting is held down by nuts on the threaded rods 50 to establish a preload on the springs. The upper pivot shaft 43 is journaled in the cam member 37 and the lower pivot shaft 42 is journaled in the link 26. Thus, a pair of springs is easily replaced if damaged or if a larger spring constant is desired. As the castings 54, 55 are brought together, the springs are further compressed, thereby increasing the force urging the plow bottom 21 downwardly.

Referring now to FIG. 3, the shank 22 is attached to an extension 26A of the rear link 26 by a bolt 60; and the plow bottom is attached directly to the shank by welding and to the extension 26A by a bolt 61. The bolt 61 is dimensioned to shear first, at a predetermined thrust on the plow bottom to avoid permanent damage to the unit.

It will be observed that whereas the upper forward and rear pivot positions 30, 31 are generally horizontally aligned, the rear lower pivot position 33 in the linkage assembly 20 is lower than the corresponding forward pivot postion 32. In other words, the length of the upper link 25 is smaller than that of the lower link 27. Thus, when the two links 25, 27 are raised in unison about the forward pivot positions 30, 32 respectively, this relationship causes the plow bottom 21 to initially move rearwardly at a rate greater than it moves upwardly. This is illustrated in FIG. 2 where the horizontal displacement of the plow tip from the normal plowing position is (FIG. 1) is indicated by X and the corresponding vertical displacement of the plow tip is indicated by Y. Thus, as the plow bottom 21 strikes the object 24, the upper link 25 and lower link 27 begin to rotate clockwise about their respective pivot locations 30, 32. Because the link 27 is longer and inclined, the top of the rear link 26 is relatively constrained, whereas the bottom is moved outwardly, causing the tip of the plow to move more rearwardly than upwardly during this initial period, and thereby allowing greater time for the system to react to the presence of the obstructions.

At the same time, as mentioned above, it is not desirable that this action take place every time heavy or compacted soil is encountered. The present invention advantageously provides that an initial force be overcome prior to achieving the reset action, and this is provided by having the roller 39 engage the seat 38 in the cam member 37 and by the preload on the springs unit 45. Referring to FIG. 2, it will be observed that the spring unit 45 exerts a force on the cam member 37 which tends to keep the seat 38 in engagement with the roller 39. That is, the cam member 37 is pivotally connected at 36 to the extension 35 of the top link 25 and the spring unit 45 exerts a clockwise force about this point. As the plow bottom 21 begins to raise, the lower part of the spring unit 45 (the pivotal connection 42) is raised, whereas the cam surface 40 rides on top of the roller 37 and urges the cam member 37 counterclockwise about pivot 36, thereby further compressing the springs of the spring unit 41 and increasing the force urging the plow bottom to a plowing position.

Referring now to FIG. 3, after the threshold 40A of the cam surface passes the roller 39, the roller engages and travels along the cam surface 41. This surface is designed to increase the compression of the springs, but at a lesser rate, until the roller engages the uppermost portion, designated 41A in FIG. 4 which, it will be observed, is curved forwardly so as to provide a stop or limit position for the roller 39, beyond which the unit cannot move.

In summary, the cam surface includes a first portion (surface 40) which acts initially to compress the spring unit at a higher rate for a given movement of the plow bottom, and a second portion 41 which continues to increase the compression of the springs as the plow bottom is raised, but at a lesser rate. These two operating portions are separated by a threshold 40A which partially defines the seat 38. The seat 38 together with the preload of the springs acts to hold the plow bottom at a fixed plowing depth for a wide range of soil conditions, but the plow will quickly and readily raise when a larger obstruction is encountered and reset when it is passed. Persons skilled in the art will appreciate that the amount of compression as well as the rate of compression depends upon the shape of the two cam surfaces, and these may be changed, as indicated above, to account for varying soil conditions in different locales.

Referring now to FIGS. 1-4 as showing the sequence for reset, it will be recalled that the horizontal displacement from the normal plowing positions is indicated by X and the vertical displacement by Y. The locus of the tip of the plow during reset in clearing the object 24 is indicated by the curved line designated 60 in FIG. 4, and in this position, the spring unit 41 is under maximum compression. The force urging the plow bottom 21 downwardly to the resetting position is determined not only by the spring compressive force but also by the distance between the axis of shaft 36 (which is the pivot location for the cam 37) and a line through the axes of shafts 42 and 43 (sometimes called the line of application of spring force). See the distance d in FIGS. 3 and 4. In other words, the reset force is a moment coupled about the pin connection 36, and even though the compressive spring force increases through the positions of FIGS. 1 through FIG. 4, the actual reset force decreases because the distance d decreases more than the spring force increases. The resetting action, of course, is the reverse sequence, and it is considered an important advantage of the present invention that the plow bottom 21 is inclined downwardly as it reenters the soil, which may be indicated by the line S in FIG. 4. Hence, as soon as the plow bottom 21 clears the object 24, it is urged downwardly and with a downward inclination and maximum force to re-enter the soil. Further, the downward inclination of the plow bottom will cause it to be rapidly and fully seated assisted by the pull of the draft vehicle until the seat 38 again engages the roller 39, as seen in FIG. 1. Thereafter, the mechanism holds the plow bottom at uniform plowing depth, as determined by the operator.

Having thus described in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. An automatic reset plow comprising: a linkage assembly connected at a forward position to a draft member; a plow bottom carried by said linkage assembly; cam means comprising a cam member defining a cam surface having first and second portions and a cam follower engaging said first portion of said cam surface when said plow is in a normal plowing position and adapted to engage said second portion of said cam surface when said plow is raised from a normal plowing position; and resilient means connected between said cam means and said linkage assembly for urging said cam surface into engagement with said cam follower and for urging said plow bottom in the plowing position; whereby said cam member and cam follower remain engaged during raising and reset of said plow and the shape of said second portion of said cam surface controls the reset force on said plow.

2. The apparatus of claim 1 wherein said first portion of said cam surface causes said resilient means to compress at a faster rate when said plow bottom strikes an object and said second portion of said cam surface causes said resilient means to compress at a lesser rate after said cam follower disengages said first portion of said cam surface and engages said second portion of said cam surface.

3. The apparatus of claim 1, wherein said linkage assembly includes upper and lower links pivotally connected at their forward ends to said draft element and an upright rear link pivotally connected to said upper and lower links, said cam member being pivotally connected to said upper link and to said resilient means, said cam follower being mounted in fixed position to the mount for said linkage assembly.

4. The apparatus of claim 3 wherein said cam member defines a seat located to receive said cam follower when said plow unit is in a normal plowing position, said seat being located forwardly of the pivotal connection of said cam member to said upper link, and the pivotal connection of said spring unit to said cam member being located rearwardly of the pivotal connection of said cam member to said upper link.

5. The apparatus of claim 3 wherein said lower link is longer than said upper link whereby during initial movement of said plow bottom, the tip thereof is caused to move rearwardly at a greater length than it moves upwardly, to give said unit additional time to react to said obstruction when said plow is being pulled by a draft vehicle.

6. The apparatus of claim 1 further comprising a first bolt for connecting said plow bottom to said linkage assembly and a lower shear bolt connecting said plow bottom to said linkage assembly 7. The apparatus of claim 1 wherein said second cam surface portion includes a stop area to limit the reset displacement of said unit.

8. An automatic reset plow unit comprising: an upright forward member connected to draft means; upper and lower links connected at their forward portion ends respectively to the upper and lower portions of said forward member; a rear link pivotally connected at its upper end to the rear end of said upper link and pivotally connected at a lower position to the rear end of said lower link; a plow bottom carried by said rear link; said upper link and said lower link being constructed and arranged to move said plow bottom upwardly when the same strikes an obstruction in such a manner that the movement of the tip of said plow unit over an initial locus is more rearwardly than upwardly; a cam member defining a seat, a first portion of a cam surface adjacent said seat, a second portion of the cam surface extending from said first portion, and a threshold portion between said first and second portions; a roller; means for pivotally mounting said cam member such that said roller resides in said seat and engages said first portion of said cam surface when said plow bottom is in a plowing position; and preloaded resilient means interconnected between said cam member and one of said movable links for urging said seat of said cam member into engagement with said roller and for urging said plow bottom into plowing position, said second portion of said cam surface being constructed and arranged to compress said resilient means at a lesser rate than the first portion thereof as said plow bottom is raised.

9. An automatic reset mechanism for a ground-working agricultural tool comprising: a linkage assembly for carrying said tool and adapted to move said tool between a lowered operative position and a raised disengaged position; mounting means for mounting said linkage assembly to a draft member; cam means including a cam member defining a cam surface having a first cam portion and a second cam portion; one of said cam member and cam follower secured to said mounting means and the other pivotally connected to said linkage assembly; spring means pivotally interconnected between said linkage assembly and said other of said cam member and cam follower for urging said cam member and cam follower into engagement and for urging said tool to said lowered position, the reset force on said tool being determined by the force exerted by said spring means and the distance between the line of spring force and said pivotal connection between said linkage assembly and said other of said cam member and said cam follower, said linkage assembly, spring means and cam means being arranged such that the actual reset force tending to urge said tool into said plowing position reduces as the tool is raised and said cam follower engages said second cam portion of said cam surface.

* * * * *